THOMAS BATES.

Improvement in Grinding and Amalgamating Ores.

No. 4,380. Reissued May 16, 1871.

Attest
J. Bode.
Norman Merrell.

Inventor
Thos. Bates
By Wood & Boyd
attorneys.

AM. PHOTO-LITHOGRAPH CO. N.Y. (OSBORNE'S PROCESS.)

United States Patent Office.

THOMAS BATES, OF CENTRAL CITY, COLORADO TERRITORY.

Letters Patent No. 102,476, dated May 3, 1870; reissue No. 4,380, dated May 16, 1871.

IMPROVEMENT IN GRINDING AND AMALGAMATING ORES.

The Schedule referred to in these Letters Patent and making part of the same.

*To all whom it may concern:*

Be it known that I, THOMAS BATES, of Central City, Colorado Territory, formerly of Pinos Altos, in the county of Grant and Territory of New Mexico, have invented a new and improved Ore-Separator; and I do hereby declare that the following is a full, clear, and exact description thereof, which will enable others skilled in the art to make and use the same, reference being had to the accompanying drawing forming part of this specification.

*Nature and Objects of the Invention.*

The object of my invention is to provide a simple and efficient arrangement of means for receiving the tailings of gold and other ores from the battery, or ore crushed by any suitable means, and to pulverize, scour, and burnish the same, ready for separating; and Secondly, to provide a simple means for amalgamating or separating the gold from the pulverized mass by the use of quicksilver.

The invention comprises—

First, a process for pulverizing, scouring, and burnishing the gold contained in crude ores after it has been crushed in a battery, or by other suitable means.

Second, a process of amalgamating the gold in a suitable amalgamator, disconnected from the pulverizing apparatus after it has been pulverized, scoured, and burnished, enabling me to separate the gold from the pulverized ore, independent of the pulverizing process.

Third, providing suitable mechanical devices to carry these methods into effect.

In methods heretofore used no plan of pulverizing, scouring, and burnishing the material, independent of the amalgamating process, has been successfully employed. The Mexican "arastrar" crushes, pulverizes, and burnishes the gold, but does it in the same pan or pit in which the quicksilver is used to amalgamate the gold, and the two processes are inseparable.

Stamping-mills pulverize the gold, independent of the separating method, but do not scour, polish, or burnish it—that is, do not free the gold from the quartz, sulphurets, or other minerals with which it is frequently allied.

My method accomplishes the pulverizing, scouring, and burnishing gold more rapidly than the arastrar, and, like the stamping-mills, pulverizes independent of the separating process, while, in addition, it scours and burnishes the gold and saves a larger percentage thereof than any other method, and at a less expense.

*Description of the Accompanying Drawing.*

To pulverize the ore and scour or burnish the small particles of gold, I take two bur-stones, E F, with a suitable dress and set, and arrange them in a similar manner to those of an ordinary grain-grinding mill, except that I do not use any casing immediately around them, leaving their entire peripheries free for the discharge of the pulverized material. This burnishing-mill E F I use in direct connection with a suitable stamping-mill or crusher, to which it is attached by the spout A, which acts as a hopper, and also conveys the tailings from the stamping-mill and the water necessary to be used. The mill E F may be operated by any known motor.

Figure 1:
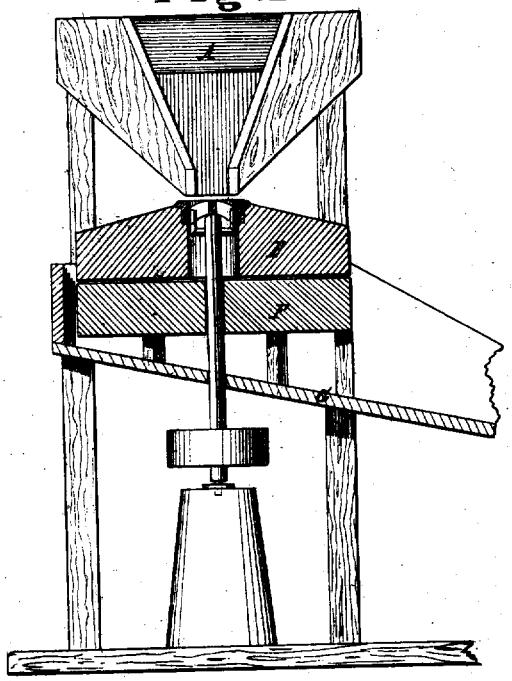
Figure 1 is a vertical section of the pulverizing-mill.
Figure 2:
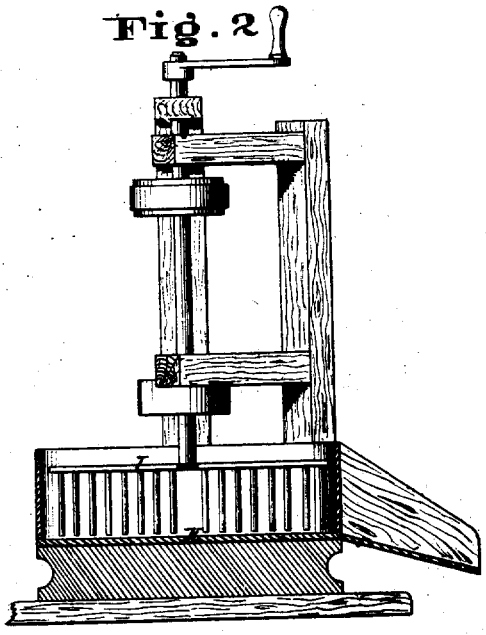
Figure 2 is a vertical section of the amalgamator.
Figure 3:
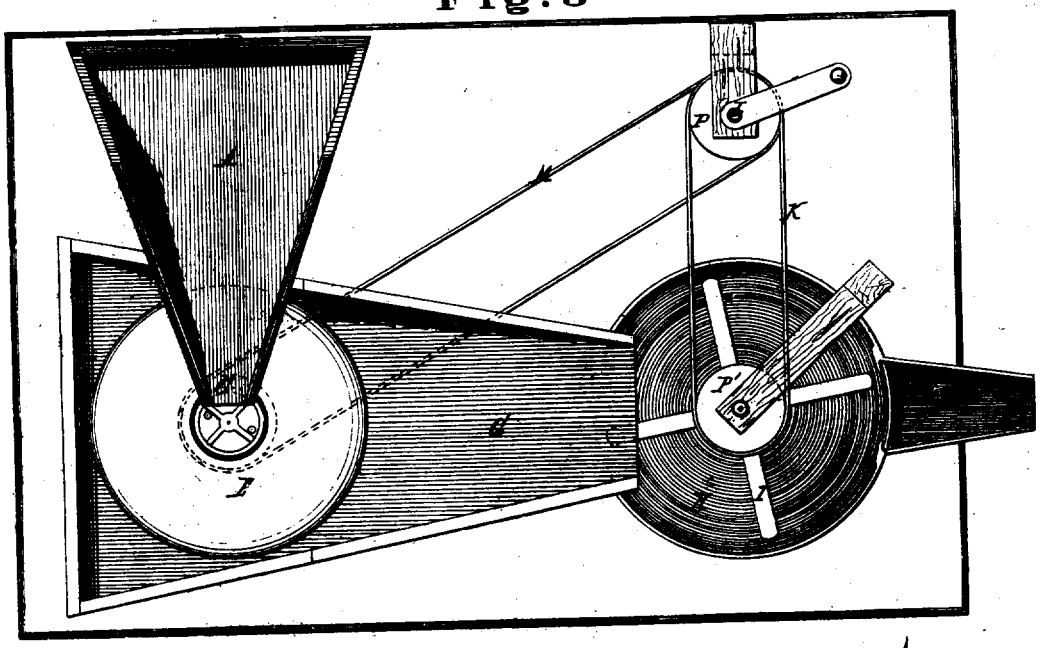
Figure 3 represents a plan view of figs. 1 and 2 when connected.

Underneath the mill is a table or spout, lined with quicksilver, placed at an angle, as seen in fig. 1, to save the gold as the ore passes from the mill, and this table may be used to conduct the material to the amalgamator.

My amalgamator is a circular vessel, H, the interior of which is made of amalgamating-plates, prepared in the usual way.

I is a horizontal rake or stirrer, which works upon a vertical axis, and is made to revolve by a belt, K, running upon pulleys P P'.

P is a driving-pulley, which is here shown connected to a driving-shaft, L.

N is a spout for carrying off the residuum.

*Claims.*

I claim as my invention—

1. The continuous process of pulverizing, scouring, and amalgamating the tailings of an ordinary battery by means of the grinding-mill E F and amalgamator H, connected by suitable spouts to each other and to the battery, substantially as herein set forth.

2. The combination of the table or spout A, grinding-mill E F, table G, amalgamator H, stirrer I, when constructed, arranged, operated, and adapted for application to and use with a battery, all substantially as specified.

THOMAS BATES. [L. S.]

Witnesses:

CHASE WITHROW,

M. MCLAUGHLIN.